US007559840B1

(12) United States Patent
D'Avanzo

(10) Patent No.: US 7,559,840 B1
(45) Date of Patent: Jul. 14, 2009

(54) GAMING MACHINE INCLUDING CONCENTRIC SPHERES AND A METHOD OF USE

(75) Inventor: Scott D'Avanzo, Ladera Ranch, CA (US)

(73) Assignee: Adrenalin Gaming, LLC, Ladera Ranch, CA (US)

( * ) Notice: Subject to any disclaimer, the term of this patent is extended or adjusted under 35 U.S.C. 154(b) by 827 days.

(21) Appl. No.: 10/843,796

(22) Filed: May 11, 2004

Related U.S. Application Data

(63) Continuation-in-part of application No. 10/687,678, filed on Oct. 17, 2003, now abandoned.

(51) Int. Cl.
*G06F 17/00* (2006.01)
*G06F 19/00* (2006.01)

(52) U.S. Cl. ............................ 463/30; 463/16; 463/20; 273/138.1; 273/139; 273/142 R; 273/142 HA; 273/138.2

(58) Field of Classification Search .................. 463/16, 463/20, 30; 273/138.1, 138.2, 139, 142 R, 273/142 HA
See application file for complete search history.

(56) References Cited

U.S. PATENT DOCUMENTS 2,219,154 A * 10/1940 Wahlberg ................... 273/146
2,301,506 A * 11/1942 Bean ...................... 273/145 C
2,794,644 A * 6/1957 Johnson ...................... 273/147
3,655,197 A * 4/1972 Milbaum .................... 273/146
3,762,086 A * 10/1973 Horbinski .................... 40/332
3,838,858 A * 10/1974 Tummescheit ............... 463/22
4,871,171 A 10/1989 Rivero
5,360,214 A 11/1994 Harmen
5,462,277 A * 10/1995 Takemoto .................... 463/20
5,823,874 A 10/1998 Adams
5,848,932 A 12/1998 Adams
5,882,261 A 3/1999 Adams
6,089,978 A 7/2000 Adams
6,105,962 A * 8/2000 Malavazos et al. ............ 463/20
D431,843 S 10/2000 Seelig et al.
6,159,097 A 12/2000 Gura
6,334,814 B1 1/2002 Adams
6,358,146 B1 3/2002 Adams
6,398,220 B1 * 6/2002 Inoue ..................... 273/142 R
6,450,884 B1 9/2002 Seelig et al.
D470,539 S 2/2003 Seelig et al.

(Continued)

*Primary Examiner*—Peter DungBa Vo
*Assistant Examiner*—Milap Shah
(74) *Attorney, Agent, or Firm*—Greenberg Traurig

(57) ABSTRACT

A gaming machine includes a secondary or bonus game comprising a mirrored disco ball. Static bonus numerals and alphanumeric LCD or LED displays in combination with the mirrors provide an exciting method of displaying a secondary game award. In response to a preestablished primary game outcome, the player may be given the opportunity to select one or more pointers adjacent the disco ball. The pointers identify which static bonus numerals and alphanumeric LCD or LED displays may be illuminated to ascertain the amount of the secondary game award. The LCD or LED displays are used to display numerals, symbols or other indicia relevant to ascertaining the amount of the secondary award. The disco ball also rotates and emits rays of light in a manner associated with a conventional disco ball and conducive to casino environment. In another version, the disco ball is comprised of an outer spherical chamber and inner spherical chamber. It is further disclosed that the outer chamber may be three independent sections.

13 Claims, 6 Drawing Sheets

U.S. PATENT DOCUMENTS

| | | | | |
|---|---|---|---|---|
| 6,533,660 | B2 | 3/2003 | Seelig et al. | |
| 6,715,756 | B2 * | 4/2004 | Inoue | 273/143 R |
| D496,968 | S * | 10/2004 | Baerlocher | D21/370 |
| D504,473 | S * | 4/2005 | Baerlocher | D21/370 |
| 6,923,441 | B2 * | 8/2005 | Inoue | 273/143 R |
| 6,974,129 | B2 * | 12/2005 | Nordman | 273/143 R |
| 7,331,861 | B2 * | 2/2008 | Nordman | 463/16 |
| 7,371,172 | B2 * | 5/2008 | Inoue | 463/20 |
| 2002/0065126 | A1 | 5/2002 | Miller et al. | |
| 2003/0176214 | A1 * | 9/2003 | Burak et al. | 463/20 |
| 2004/0000754 | A1 * | 1/2004 | Inoue | 273/143 R |
| 2004/0106450 | A1 * | 6/2004 | Seelig et al. | 463/30 |
| 2004/0214630 | A1 * | 10/2004 | Mayeroff | 463/20 |
| 2005/0059478 | A1 * | 3/2005 | Peterson et al. | 463/20 |

* cited by examiner

GAMING MACHINE INCLUDING CONCENTRIC SPHERES AND A METHOD OF USE

CROSS-REFERENCE TO RELATED APPLICATIONS

This application is a continuation-in-part of application Ser. No. 10/687,678 filed Oct. 17, 2003 now abandoned.

FIELD OF THE INVENTION

The present invention relates to an electronic gaming machine. More particularly, a gaming machine which incorporates a secondary game in the form of a display ball mechanism.

BACKGROUND

The popularity of legalized gaming has become so prolific that nearly every state has some form of state sponsored gaming. A large majority of the legalized gaming is in the form of electronically implemented gaming machines, such as slot machines, video poker machines, keno machines, bingo machines, etc. In fact, gaming machines now generate more casino revenue than traditional table games, such as blackjack, roulette and craps.

In particular, slot machines have seen a continuous increase in numbers throughout the gaming industry. To keep a continued high interest level in slot machines, many new machines are outfitted with secondary or bonus games. Secondary games are routinely triggered by preestablished primary game outcomes. Generally the secondary game then results in a secondary or bonus award. For example, the popular Wheel of Fortune® slot machine is premised on the popular television show of the same name. In this arrangement, a secondary game comprises a rotatable wheel in communication with a random number generator. The wheel is activated by the player in response to a preestablished primary game outcome. Each activation of the wheel results in a bonus award as ascertained by a pointer arranged about the wheel.

Many new slot machines incorporate other types of secondary games, such as keno type apparatuses, which serve the same purpose as the Wheel of Fortune® wheel. Although secondary games have become popular, they tend to lack much excitement and flare. The embodiments of the present invention seek to overcome the lack of excitement and flare of the former secondary games.

SUMMARY

Accordingly, the embodiments of the present invention utilize a sphere, or a similar form, for supporting a plurality of reflective units. In one embodiment, the surface of a sphere is covered by a plurality of square mirrors, some of which depict static bonus awards, to resemble a disco ball. The depicted static bonus awards are, or maybe, illuminated, when necessary, by light means situated beneath, or around, the square mirrors. Other mirrors conceal or incorporate dynamic bonus award indicators which facilitate the determination of a player's ultimate bonus award. Besides being a unique vehicle for determining and displaying a bonus award, the disco ball embodiment is ideal for attracting players in a casino environment. The disco ball of the secondary game, like a conventional disco ball, rotates and emits beams of light into a plurality of directions.

Thus, in practice, in response to a player receiving a preestablished primary game outcome, the disco ball is activated such that a pattern of static bonus awards are individually lighted until the lighted pattern reaches a dynamic bonus award indicator. In one embodiment, the sum of each static indicator (e.g., $10, $5, $5 and $10) forms a temporary bonus award. Ideally, the dynamic indicators can be LED, LCD, video or digital modules (referred to as "dynamic light modules" hereinafter). Once a dynamic light module is reached by the lighted pattern of static bonus awards, the dynamic light module displays one of a possible number of preprogrammed numerals or symbols based on a preestablished bonus. The numeral or symbol then acts to cease the light pattern, continue the light pattern, enhance or diminish the bonus award or cause any number of actions with respect to the disco ball and bonus award to occur. In this manner, the player is subjected to a great deal of anticipation and excitement waiting for the final bonus award.

It is also contemplated that one or more pointers will identify the static and dynamic indicators depicting the bonus award. In one embodiment, a plurality of pointers are spaced about an exposed surface of the disco ball and identify separate rows, columns and diagonals of static and dynamic indicators. The pointers are either machine selected in response to the primary game outcome or players are provided with means to select desired pointers.

Any number of light patterns are conceivable including patterns following rows, columns or diagonal arrangements of static and/or dynamic mirrors. The large number of possible patterns ensures that the bonus game does not become stale to players.

To enhance the experience, music may be triggered in conjunction with the operation of the disco ball. Forms other than a sphere may be covered in reflective units to accomplish the same objective as the disco ball embodiment. Other embodiments and objects of the present invention will become evident as the present invention is described in further detail below.

DETAILED DESCRIPTION

The operation of electronic gaming machines, including slot machines and video poker machines, is well known in the industry so that the intimate details are not set forth herein. In general terms, electronic gaming machines are controlled by processors including, or in communication with, a random number generator. The random number generator generates the machines' outcomes. In this case, the primary and secondary game outcomes. The gaming machines of the embodiments of the present invention include a primary game in communication with a secondary game. A primary and secondary display in communication with the processor provides visual and graphic information to players.

Figure 1:
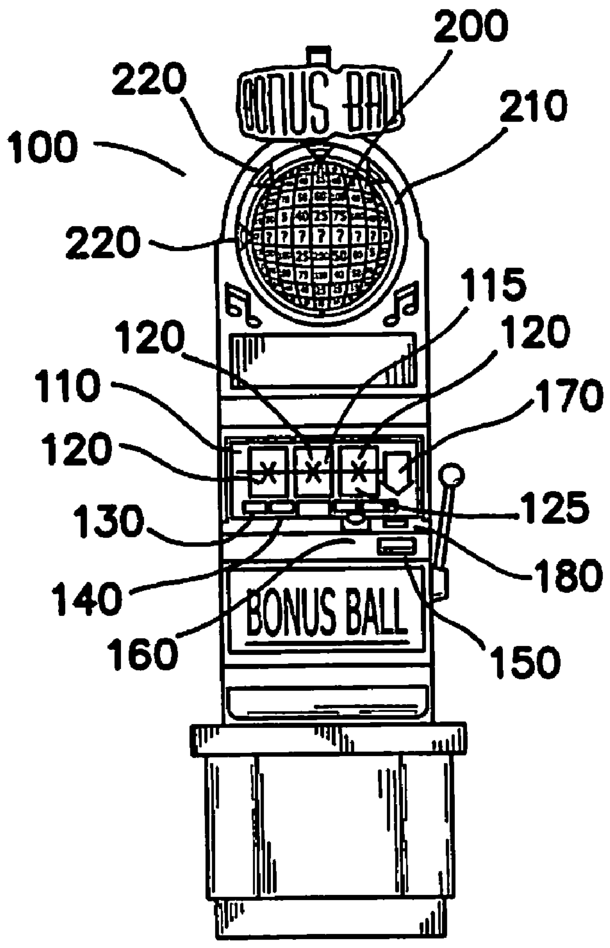
FIG. 1 shows a front view of a slot machine having a secondary or bonus game facilitated by a disco ball.

Reference is now made to the figures wherein like parts are referred to by like numerals throughout. FIG. 1 illustrates a front view of a slot machine generally designated as reference numeral 100. The external features of the slot machine 100 include a display area 110, three reels 120, having gaming indicia 125, a maximum coin wager button 130, a single coin wager button 140, a card reader 150, a coin slot 160, a credit display 170 and a bill reader 180. While not shown, the slot machine 100 can also incorporate a ticket reader and printer for facilitating cashless play. It is also noted that the slot machine 100 may be mechanical or video in nature. Moreover, in addition to a slot machine, the underlying machine may be a video poker machine, video keno machine, video bingo machine and the like.

The display area 110 of the slot machine 100 also incorporates one or more pay lines 115 used in conjunction with the gaming indicia 125 to determine primary game outcomes. As is common in slot machines, certain gaming indicia 125 bisected by the pay lines 115 are used to determine the primary game award, if any.

A secondary or bonus game comprises a disco ball 200 integrated into a top portion of the slot machine 100. A viewable portion of the disco ball 200 is encapsulated by a transparent member 210. The transparent member 210 prevents any purposeful or accidental tampering with the operation of the disco ball 200. For reasons set forth below, pointers 220 arranged about the perimeter of the disco ball 100 identify certain rows, columns and/or diagonals of the disco ball 100.

Figure 2:
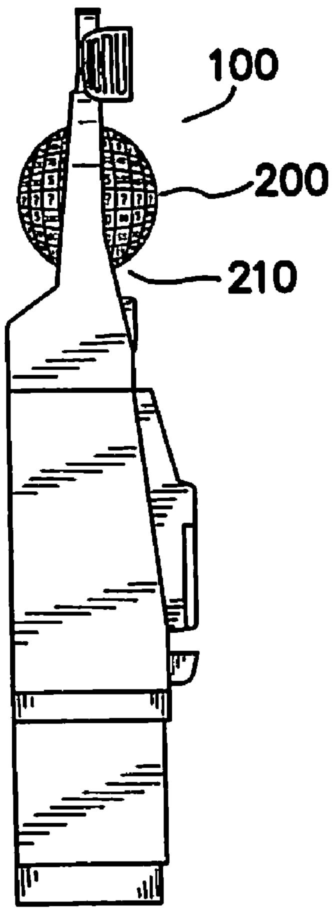
FIG. 2 shows a side view of the slot machine having a secondary or bonus game facilitated by the disco ball.

FIG. 2 shows the slot machine 100 from the side. The side view reveals that the disco ball 200 extends away from the machine 100 such that approximately one-half of the disco ball 200 is viewable by players or patrons at all times. The other one-half of the disco ball 200 is concealed within the machine 100. The disco ball 200 is rotatably connected to the machine 100 at its upper and lower poles such that the disco ball 200, when activated, rotates about a vertical, horizontal or offset axis through its core.

While a disco ball 200 is shown in the figures, other shapes and forms are obviously possible. For example, a diamond, cube, pyramid or the like may also support a plurality of reflective units or mirrors as disclosed herein.

Figure 3:
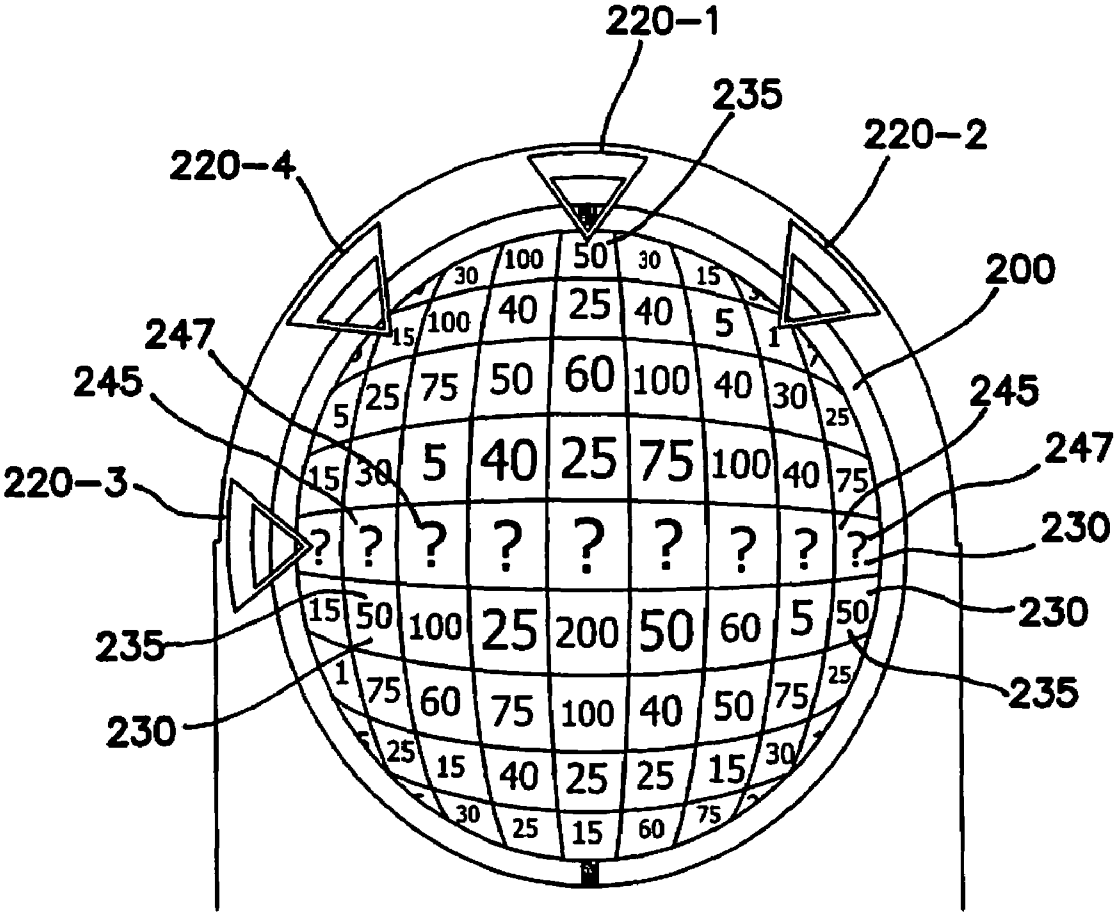
FIG. 3 shows the disco ball and pointers in greater detail.

FIG. 3 shows the arrangement of the disco ball 200 and pointers 220-1 through 220-4. The disco ball 100 comprises a plurality of individual reflective units or mirrors 230. The reflective units 230 may take any shape. A certain number of the mirrors 230 include static bonus numerals 235 depicted thereon and conceal illumination devices, such as light emitting diodes ("LEDs"). Other mirrors 230 cover dynamic alphanumeric LCD or LED displays 245 capable of displaying alphanumeric characters and related symbols. Other displays including multi-segment displays, vacuum fluorescent displays and electro-luminescent displays are also conceivable. As shown in FIG. 3, a row of the LCD or LED displays 245 display question marks 250. There can be any ratio of static bonus numerals 235 to dynamic alphanumeric LCD or LED displays 245. The mirrors 230 covering the alphanumeric LCD or LED displays 245 are translucent to allow light from the alphanumeric LED or LCD displays 245 to pass therethrough. During inactivity, the LCD or LED displays 245 display question marks 250 signifying yet to be determined outcomes which create anticipation with players. It is also possible that the LCD or LED displays 245 can display different colors to further attract players.

Figure 4:
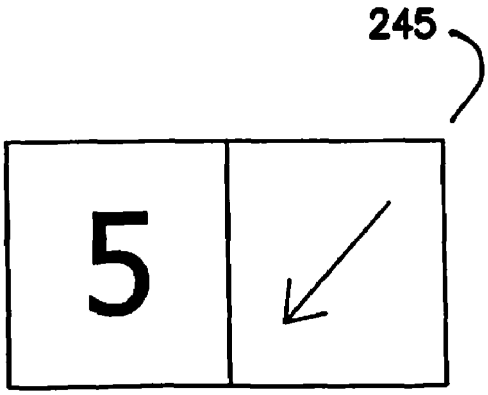
FIG. 4 shows an LED module of the present invention.

FIG. 4 illustrates a two character alphanumeric LED or LCD display 245 which may facilitate the operation of the disco ball 100. As stated above and below, the display can take other forms from that shown in FIG. 4. The alphanumeric LED or LCD display 245 is ideal for displaying numbers or symbols. Other individual displays, including video displays, can also serve the objective of the LED or LCD display 245. Each LED or LCD display 245 communicates, individually or through a control unit, with the gaming machine processor. In this manner, as is known in the art, the processor is responsible for controlling the operation of each LED or LCD display 245. To that end, the processor causes the LED or LCD displays 245 to display the required numbers, symbols or other indicia calculated by the random number generator. In fact, the processor controls most, if not all, operations associated with the disco ball 100 and the primary wagering game.

Suitable displays and processors for facilitating the embodiments of the present invention are available through a myriad of suppliers. Moreover, those skilled in the art understand the concept of driving display devices with a microprocessor as discussed herein.

Figure 5:
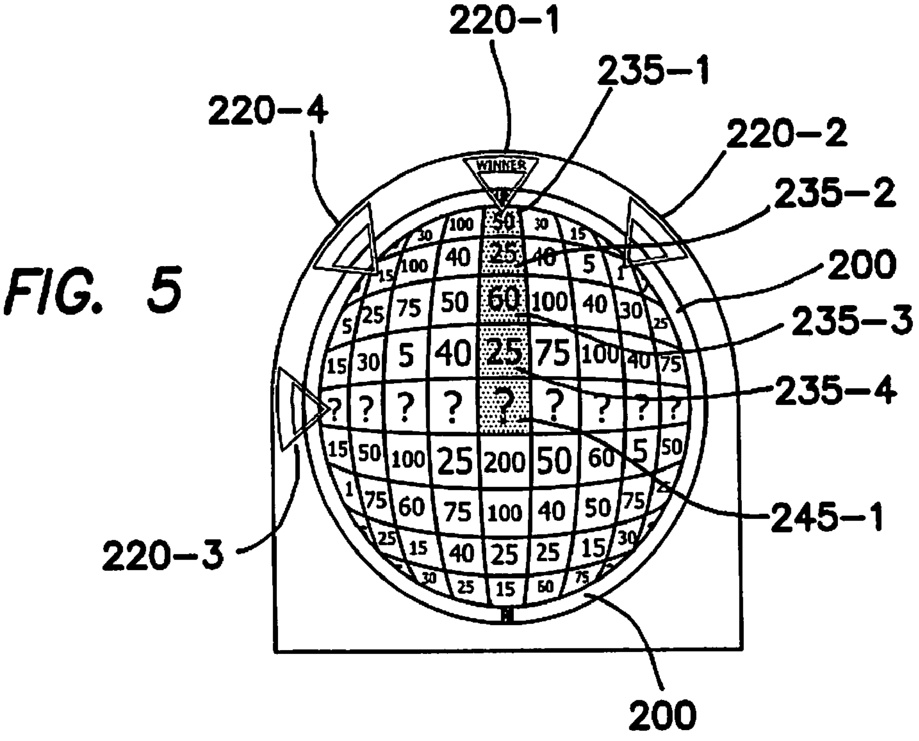
FIG. 5 shows the disco ball with a portion of a pattern of bonus award indicators illuminated.

In practice, upon the occurrence of a preestablished primary game outcome, the disco ball 200 is activated. If not constantly rotating, the disco ball 200 first begins to rotate and emit rays of light in a manner identical to a conventional disco ball. One or more light sources (not shown) in close proximity (e.g., within the transparent member 210) to the disco ball 200 provide the light for creating the emitted rays of light. After a preestablished time period, the disco ball 200 stops rotating. Then as shown in FIG. 5, a player or machine selected pointer 220-1 identifies a column of static bonus numerals 235-1 through 235-4 which illuminate in succession and ideally remain illuminated. The selected pointer or pointers also illuminate to identify the active pointers. Once the illuminated static bonus numerals 235-1 through 235-4 reach the row of LED or LCD displays 245, the LED or LCD display 245-1 in the column selected by the pointer 220-1 next illuminates to indicate the direction the pattern will take.

Figure 6A:
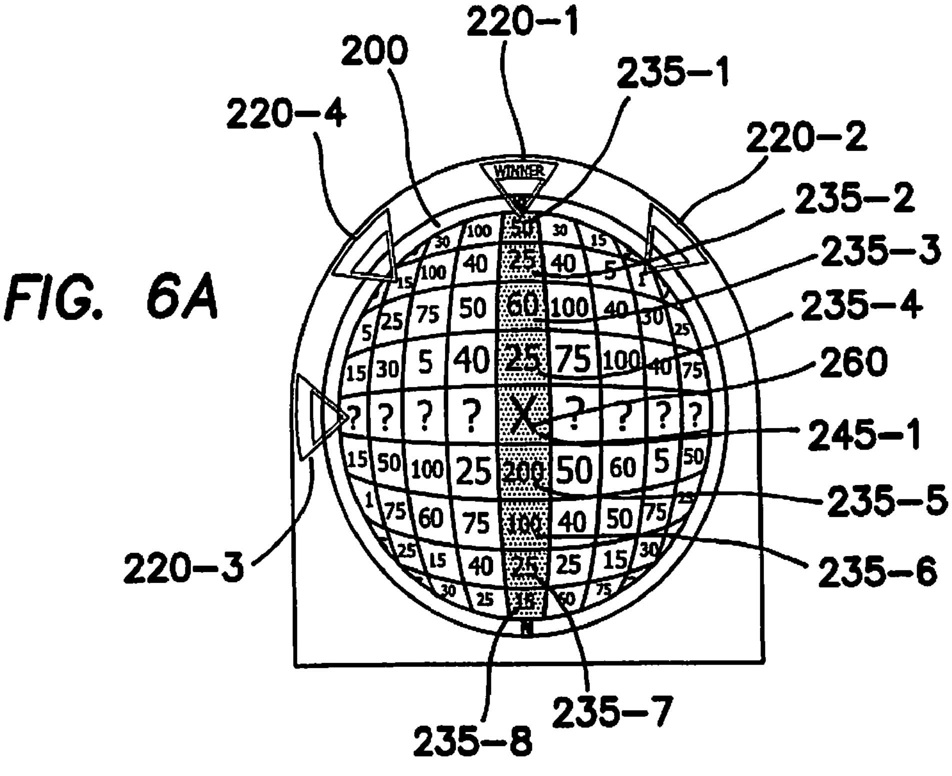
FIG. 6A shows the disco ball with a first complete pattern of bonus award indicators illuminated.
Figure 6B:
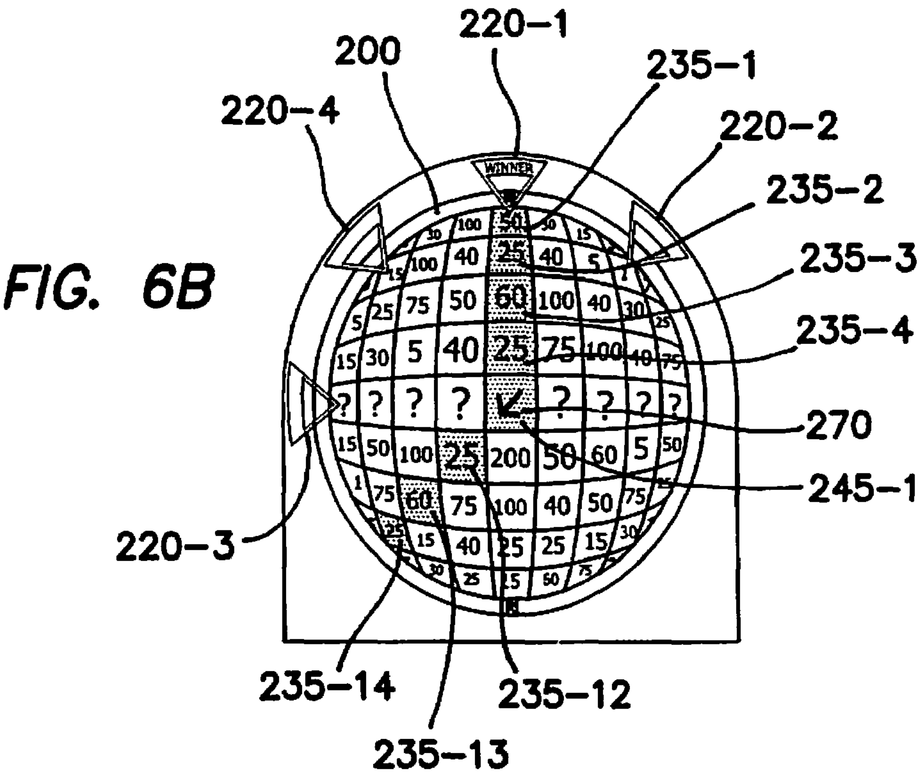
FIG. 6B shows the disco ball with a second complete pattern of bonus award indicators illuminated.

In FIG. 6A, the static numerals 235-1 through 235-4 identified by player selected pointer 220-1 are illuminated. The column of illuminated static bonus numerals 235-1 through 235-4 successively illuminate to the row of alphanumeric LED or LCD displays and specifically 245-1. In the example shown, the question mark of the alphanumeric display 245-1 has changed into a multiplication sign 260. The multiplication sign 260 indicates that the sum of the static numerals 235-1 through 235-4 above the LCD or LED display 245-1 is going to be multiplied by the sum of static numerals 235-5 through 235-8 below the LCD or LED display 245-1. The appearance of the multiplication sign 260 is pre-determined by the random number generator which has randomly calculated the amount of the final bonus award. In FIG. 6B, the LCD or LED display 245-1 displays a addition symbol 265. The addition symbol 265 causes the static bonus numerals 235-9 through 235-11 to be added to the static bonus numerals 235-12 through 235-14. In this case, the active pointer 220-2 identifies a new winning direction of static bonus numerals 235-9 through 235-14.

Figure 6C:
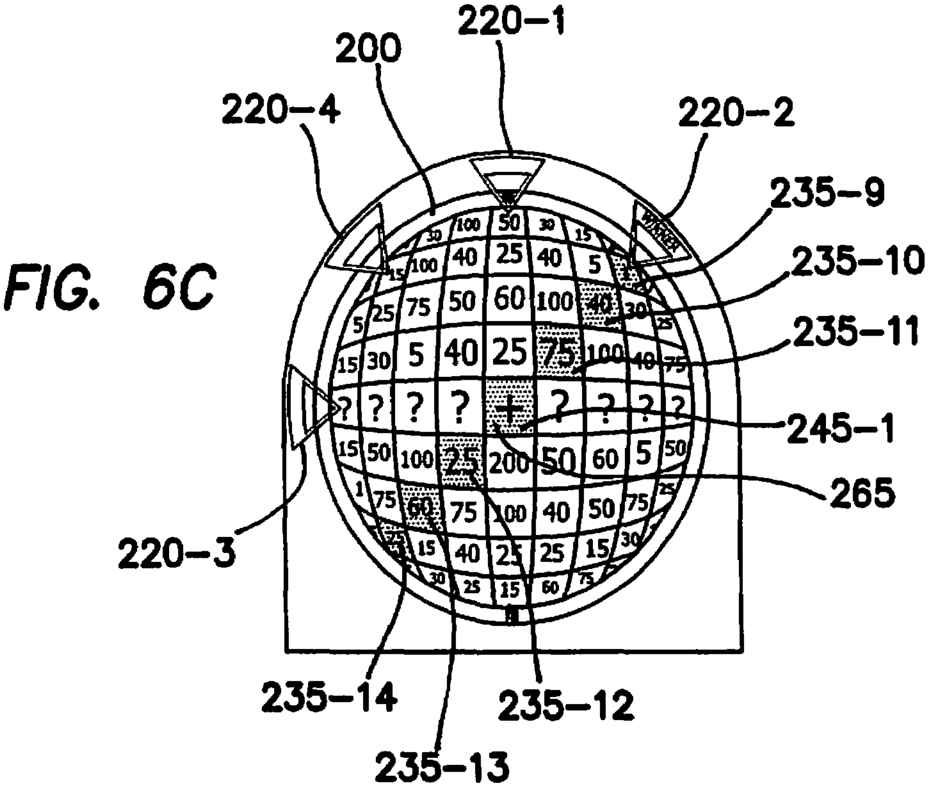
FIG. 6C shows the disco ball with a third complete pattern of bonus award indicators illuminated.

In FIG. 6C, an arrow 270 is displayed by the LCD or LED display 245-1. The arrow 265 points in the direction of the next illuminated static bonus numerals 235-12 through 235-14 which continue to illuminate. Each of the illuminated static bonus numerals 235-1 through 235-4 and 235-12 through 235-14 is then added to one another to determine the bonus award. Other mathematical signs, including the division and minus signs, can also be used to calculate bonus awards.

Figure 6D:
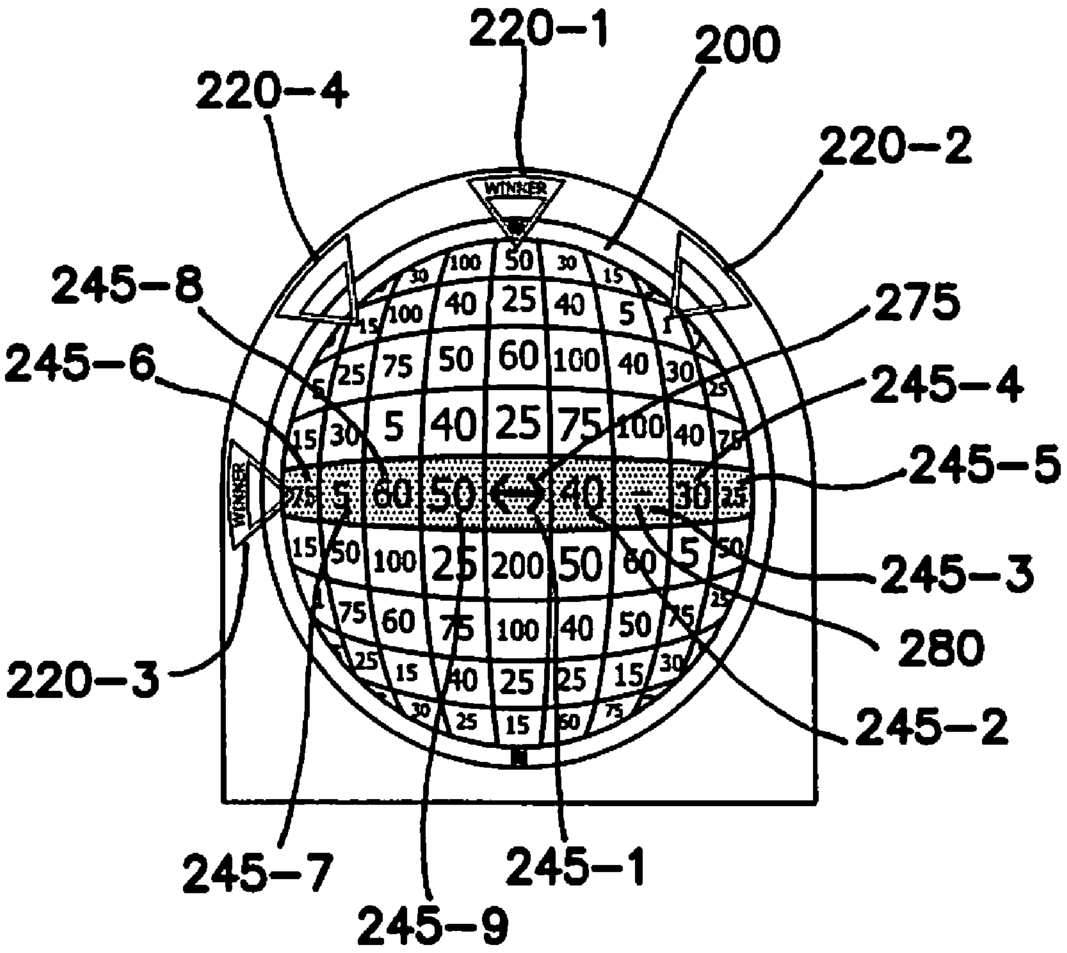
FIG. 6D shows the disco ball with a fourth complete pattern of bonus award indicators illuminated.

Other symbols, including bi-directional arrows, may cause the path of illuminated static bonus numerals 235 and the LCD or LED displays 245 to continue in multiple directions until a stopping event at which time a bonus award is calculated. FIG. 6D shows the disco ball 200 with a bi-directional arrow 275 illuminated. Once the bi-directional arrow 275 appears, the adjacent LCD or LED displays 245-2 through 245-9 illuminate in succession. In addition to pointer 220-1 pointer 220-3 also illuminates to signify that the bonus award includes the values and symbols displayed by the row of LCD or LED displays 245-1 through 245-9. As shown, LCD or LED display 245-3 displays a minus sign 280 which subtracts the values to the right of the minus sign 280 from the other displayed values.

With the disclosed arrangement, it is possible to create any number of lighted paths along the surface of the disco ball 200. Indeed, each mirror 230 may cover alphanumeric LCD or LED displays 245 instead of a combination of static bonus numerals 235 and LCD or LED displays 245. However, the combination of static bonus numerals 235 and LCD or LCD displays 245 is the more inexpensive design.

Figure 7A:
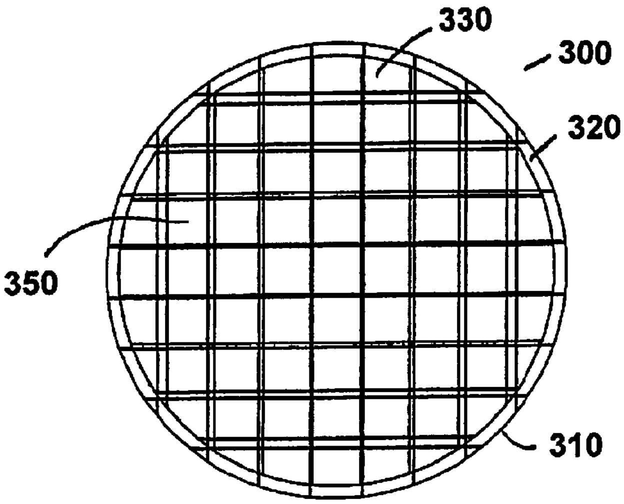
FIGS. 7A-7C show a dual chamber embodiment of the disco ball.
Figure 7B:
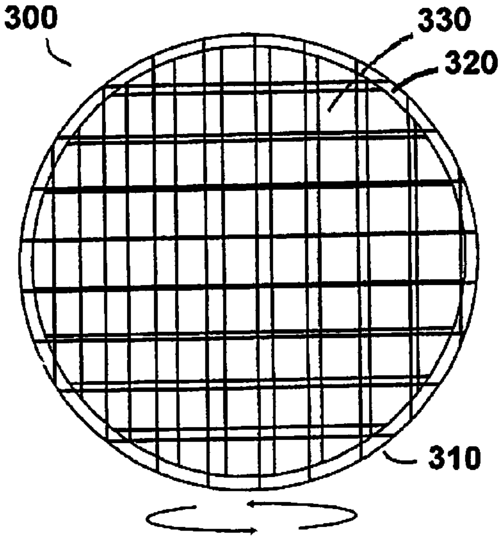
Figure 7C:
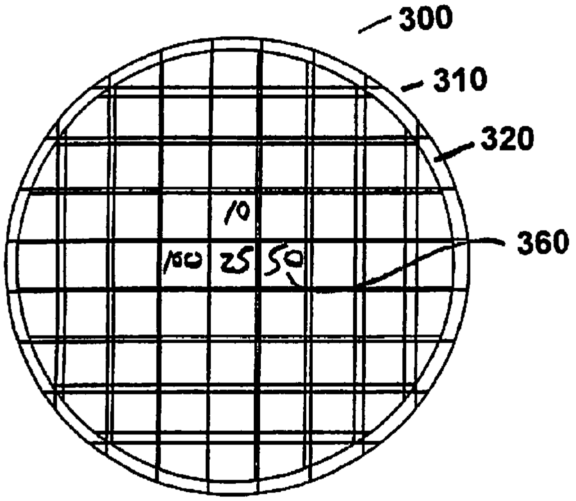

Now referring to FIGS. 7A-7C, a dual chamber disco ball 300 comprises an outer spherical chamber 310 and inner spherical chamber 320. The inner spherical chamber 320 includes a plurality of squares 330 and/or illumination devices, such as LED or light bulbs, incorporated therewith. The outer spherical chamber 310 includes a plurality of mirrored or reflective squares 350 having bonus numerals 360 or symbols depicted on a surface thereof. As shown in FIG. 7B, in response to a pre-established primary game outcome, the outer spherical chamber 310 spins about the inner spherical chamber 320 until the squares 350 of the outer spherical chamber 310 align with the squares 330 or illumination devices of the inner spherical chamber 320. As shown in FIG. 7C, once aligned, the appropriate LEDs or light bulbs incorporated on the inner spherical chamber 320 illuminate to highlight the proper bonus numerals 360 thereby identifying the award for the player. To enhance the effect, the outer squares 350 may be spaced such that light from the illumination devices is able to shine through the spaces. The numerals or symbols may also be depicted on the squares of the outer spherical chamber 310. Alternatively, the inner LEDs may be in the form of numerals or symbols such that the numerals or symbols do not have to be depicted on the squares 330, 350.

In the dual chamber embodiment, a motor (not shown) controlled by the machine's processor drives and stops the outer spherical chamber 310 as required to display the randomly generated award. In alternative embodiments, if necessary, the motor may drive the inner spherical chamber 320 as well. As with the single sphere embodiment, a vertical shaft may support the outer spherical chamber 310 and the inner spherical chamber 320. Accordingly, the shaft incorporates rotatable segments to permit one or both chambers to rotate as desired.

It is also conceivable that the inner spherical chamber 320 may be replaced with a static half-sphere design having the squares 330 and/or illumination devices. In an embodiment where the inner spherical chamber 320 does not rotate, the half-sphere accomplishes the same objective as the inner spherical chamber 320. Moreover, the machine housing will conceal the design of the half-sphere such that players may be under the belief that the half-sphere is actually a complete sphere. In this embodiment, the outer spherical chamber 310 rotates about the half-sphere.

In an alternative embodiment, the outer spherical chamber 310 is comprised of three independent sections, namely a top section, bottom section and middle section. The middle section is comprised of a circular band of squares 350 at a equator of the outer spherical chamber 310. The top and bottom sections are similar to symmetric bowls above and below the middle section. In this embodiment, each section rotates independently of the others. The sections may rotate in different directions as well.

It is obvious that any types of symbols may be incorporated on the illuminated devices or displayed by the LCD or LED displays. For example, a stop sign may be displayed to halt the progress of an illuminated path.

Moreover, in another embodiment, the player may select multiple pointers 220 to identify multiple paths of illumination. Alternatively, the player may be awarded multiple pointers by playing more coins. It is envisioned that the number of pointers 220 which the player may select during each activation of the disco ball 200 will be determined by the outcome of the primary game. Alternatively, the processor may randomly select the pointer or pointers. Also, a player may be provided with more than one activation of the secondary game if dissatisfied with the prior outcome. It is also noted that the static bonus indicators 235 and dynamic bonus indicators 245 may illuminate randomly rather than in a preestablished path.

In another embodiment, the disco ball 200 is replaced with a global pattern (not shown). In the global pattern embodiment, pointers may be used to identify winning destinations (e.g., Rome) for the player. Alternatively, the pointer may stop on land to indicate a winning outcome or may stop on water to indicate a losing outcome.

Although the invention has been described in detail with reference to a preferred embodiment, additional variations and modifications exist within the scope and spirit of the invention as described and defined in the following claims.

I claim:

1. A gaming machine comprising:
- an electronic primary game;
- a secondary game in communication with said primary game, said secondary game activated in response to one or more pre-established primary game outcomes, said secondary game including a sphere having an outer spherical chamber concentrically formed about an inner spherical chamber, said outer spherical chamber comprising an upper section, lower section and middle section independent of one another and each rotatable about said inner spherical chamber, said inner spherical chamber incorporating one or more illumination devices; and
- a controller for causing said upper section, lower section and middle section of said outer spherical chamber to rotate about said inner spherical chamber such that when said upper section, lower section and middle section of said outer spherical chamber stops said illumination devices align with and highlight numerals or symbols depicted on said upper section, lower section and middle section of said outer spherical chamber to define a randomly generated award.

2. The gaming machine of claim 1 wherein the inner spherical chamber includes one or more numerals or symbols depicted on a surface thereof.

3. The gaming machine of claim 1 wherein the upper section, lower section and middle section of said outer spherical chamber each includes a plurality of reflective units on a surface, said reflective units being spaced to allow light from said illumination devices to shine therethrough.

4. The gaming machine of claim 1 wherein the upper section, lower section and middle section of said outer spherical chamber each includes a plurality of reflective units on a surface, said reflective units being transparent to allow light from said illumination devices to shine therethrough.

5. A gaming machine comprising:

an electronic primary game;

a secondary game in communication with said primary game, said secondary game activated in response to one or more preestablished primary game outcomes, said secondary game including a sphere having an outer spherical chamber concentrically formed about an inner spherical chamber, said outer spherical chamber comprising an upper section, lower section and middle section independent of one another, said upper section, lower section and middle section rotatable relative to said inner spherical chamber, said inner spherical chamber incorporating one or more illumination devices; and a controller for causing said upper section, lower section and middle section of said outer spherical chamber and inner spherical chamber to rotate relative to one another such that when said upper section, lower section and middle section of said outer spherical chamber and inner spherical chamber stop said illumination devices align with and highlight numerals or symbols depicted on said upper section, lower section and middle section of said outer spherical chamber to define a randomly generated award.

6. The gaming machine of claim 5 wherein the inner spherical chamber includes one or more numerals or symbols depicted on a surface thereof.

7. The gaming machine of claim 5 wherein the reflective units are transparent to allow light from said illumination devices to shine therethrough.

8. The gaming machine of claim 5 wherein the upper section, lower section and middle section of said outer spherical chamber each includes a plurality of reflective units on a surface, said reflective units being spaced to allow light from said illumination devices to shine therethrough.

9. A method of displaying an award comprising:

in response to a winning outcome, independently rotating one or more of an upper section, lower section and middle section forming an outer spherical chamber concentrically about an inner spherical chamber, said upper section, lower section and middle section of said outer chamber comprising a series of reflective units incorporating numerals or symbols thereon;

stopping said one or more of said upper section, lower section and middle section of said outer spherical chamber with said reflective units aligned with illumination devices included with said inner chamber; and illuminating one or more of said illumination devices to identify one or more numerals or symbols, said numerals or symbols defining a randomly generated award.

10. The method of claim 9 wherein the illumination devices are LEDs.

11. The method of claim 9 wherein the reflective units are mirrors.

12. The method of claim 9 wherein the outer spherical chamber and inner spherical chamber form a disco ball.

13. The method of claim 9 wherein the reflective units are transparent to allow light from said illumination devices to shine therethrough.

* * * * *